(12) United States Patent  (10) Patent No.: US 9,199,329 B2
Kettunen  (45) Date of Patent: Dec. 1, 2015

(54) MIG- OR MAG-WELDING GUN

(71) Applicant: Ergowelder Oy, Viinijarvi (FI)

(72) Inventor: Erkki Tapio Kettunen, Viinijärvi (FI)

(73) Assignee: ERGOWELDER OY (FI)

( * ) Notice: Subject to any disclaimer, the term of this patent is extended or adjusted under 35 U.S.C. 154(b) by 0 days.

(21) Appl. No.: 14/091,025

(22) Filed: Nov. 26, 2013

(65) Prior Publication Data

US 2014/0083990 A1  Mar. 27, 2014

Related U.S. Application Data

(63) Continuation-in-part of application No. 12/530,410, filed as application No. PCT/FI2008/050106 on Mar. 7, 2008, now abandoned.

(30) Foreign Application Priority Data

Mar. 9, 2007  (FI) ...................................... 20075164

(51) Int. Cl.
*B23K 9/167* (2006.01)
*B23K 9/173* (2006.01)
*B23K 9/29* (2006.01)

(52) U.S. Cl.
CPC ................. *B23K 9/167* (2013.01); *B23K 9/173* (2013.01); *B23K 9/295* (2013.01)

(58) Field of Classification Search
None
See application file for complete search history.

(56) References Cited

U.S. PATENT DOCUMENTS 1,508,689 A  9/1924  Glasser
1,533,874 A  4/1925  Livermore (Continued)

FOREIGN PATENT DOCUMENTS

GB  2426390 A  11/2006
JP  39-24233 Y  8/1964

(Continued)

OTHER PUBLICATIONS

World Intellectual Property Office (National Board of Patents and Registration of Finland, Hannu Hammainen, authorized officer), "Written Opinion of the International Searching Authority" for PCT/FI2008/050106, mailing date Jun. 12, 2008 (5 pages). This US application is a national-phase application of PCT/FI2008/050106.

(Continued)

*Primary Examiner* — Mark Tornow
*Assistant Examiner* — Abbigale Boyle
(74) *Attorney, Agent, or Firm* — Kolisch Hartwell, P.C.

(57) ABSTRACT

The invention relates to a MIG- or MAG-welding gun, comprising a hand-held grip for supporting, handling and aiming the welding gun during a welding process, the grip including a body member (1). The grip further includes a grip member (2) pivotable relative to the body member (1) and lying alongside the body member over at least part of the same lengthwise extent as the body member. The grip member (2) has its free end pivotable to such a distance from the body member (1) that a hand grasping around the pivotable grip member (2) fits between the body member (1) and the pivotable grip member (2), the body member (1) resting on top of the hand. When the pivotable grip member (2) has its free end is in its position pivoted into the engagement with the body member (1), these two components constitute jointly a handle for the hand to grasp around.

13 Claims, 2 Drawing Sheets

(56) References Cited

U.S. PATENT DOCUMENTS

| | | | |
|---|---|---|---|
| 1,561,055 | A | 11/1925 | Callahan |
| 1,953,915 | A | 4/1934 | Burgett et al. |
| 2,059,605 | A | 11/1936 | Powell |
| 2,364,508 | A | 12/1944 | Bernard |
| 3,109,916 | A | 11/1963 | Kilburn et al. |
| 3,480,759 | A | 11/1969 | Sachs et al. |
| 4,145,595 | A | 3/1979 | Keller et al. |
| 4,161,643 | A | 7/1979 | Martin, Jr. et al. |
| 4,604,514 | A | 8/1986 | Thaler et al. |
| 5,139,171 | A | 8/1992 | Mäder |
| 5,491,321 | A * | 2/1996 | Stuart et al. ............... 219/137.61 |
| 6,225,599 | B1 | 5/2001 | Altekruse |
| 6,539,770 | B2 * | 4/2003 | Olsson ........................... 72/458 |
| 7,029,136 | B2 | 4/2006 | Hsu |
| 7,186,950 | B1 | 3/2007 | Fisher |
| 2006/0043080 | A1 | 3/2006 | Hubinger et al. |
| 2010/0102037 | A1 | 4/2010 | Kettunen |

FOREIGN PATENT DOCUMENTS

| | | | |
|---|---|---|---|
| JP | 47-37927 | * | 5/1972 |
| JP | 47-37927 U | | 5/1972 |
| JP | 2004-114626 A | | 4/2004 |
| JP | 2006-321043 | | 11/2006 |
| WO | 0234450 A1 | | 5/2002 |
| WO | 2008110663 A1 | | 9/2008 |

OTHER PUBLICATIONS

Notice of Reasons for Rejection in connection with corresponding Japanese Patent Application No. 2009-552237, dated Oct. 30, 2012, 8 pages.

Definition of trough: "http://www.dict.org/bin/Dict?Form=Dict2&Database=*Query=trough" originally accessed Nov. 14, 2012 and reprinted Apr. 30, 2014.

* cited by examiner

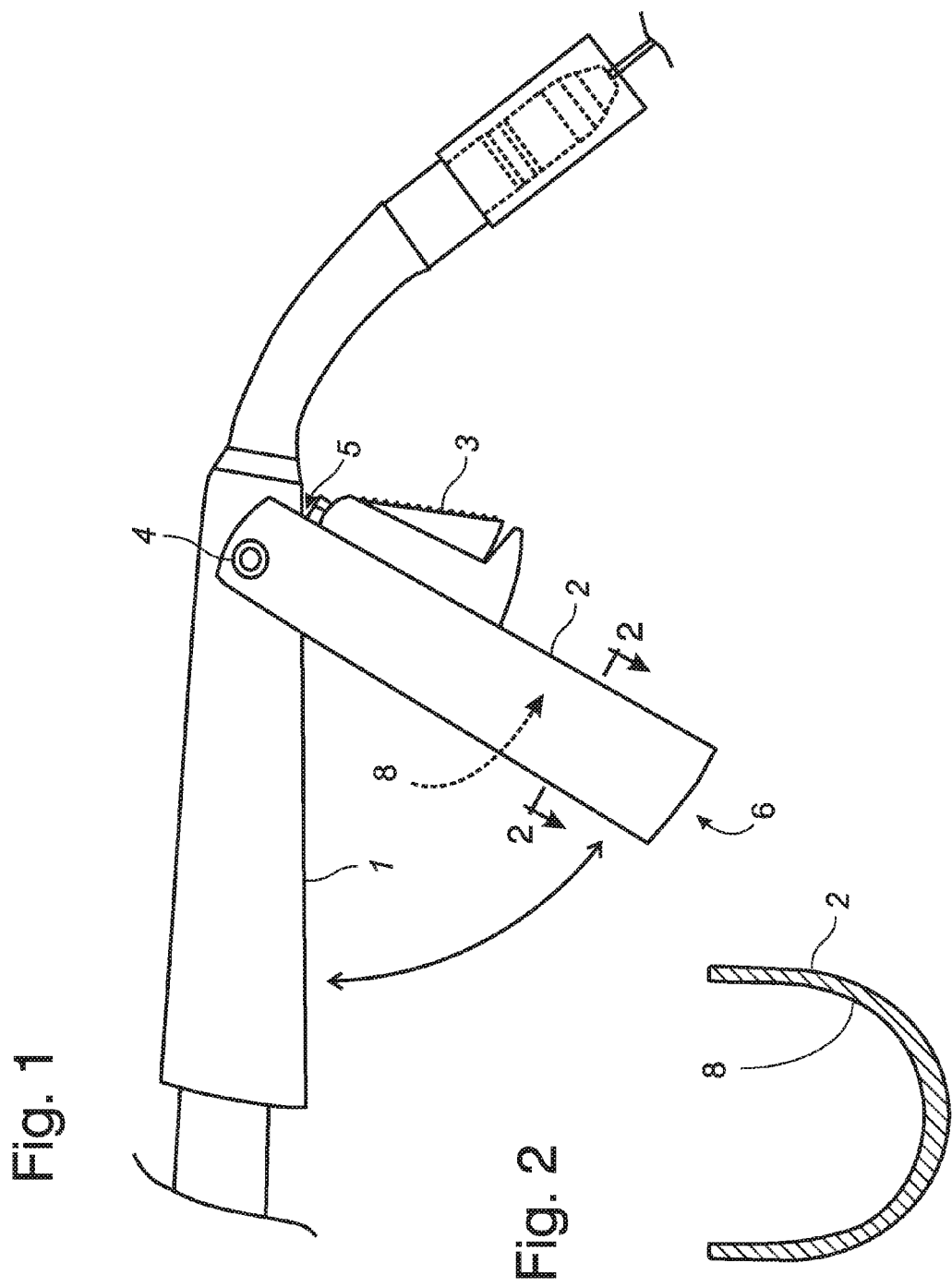

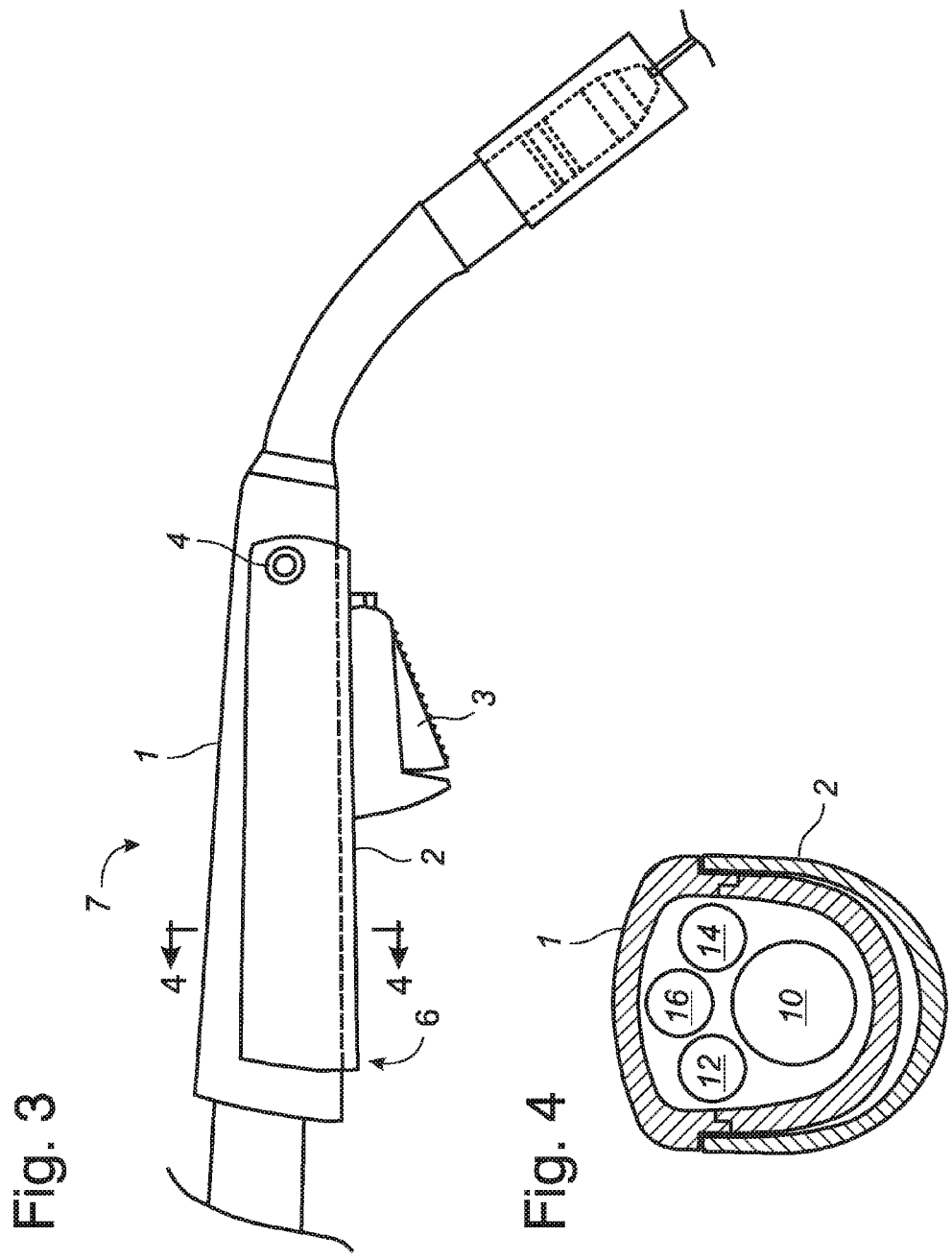

MIG- OR MAG-WELDING GUN

CROSS-REFERENCE TO RELATED APPLICATIONS

This application is a continuation-in-part of U.S. patent application Ser. No. 12/530,410, filed Mar. 7, 2008 and entitled "MIG- or MAG-WELDING GUN", which disclosure is incorporated herein by reference in its entireties for all purposes.

TECHNICAL FIELD

The invention relates to a MIG- or MAG-welding gun, comprising a hand-held handle for supporting, handling and aiming the welding gun during a welding process.

BACKGROUND

Patent publications WO 0234450 and U.S. Pat. No. 4,161,643 disclose welding guns having a pistol-type handle, including a pivotable grip. These handles have not become generally popular for the reason of being heavy and only enabling one type of operating mode in which the hand is always under the body. Consequently, the models in general use are those without a handgun grip protruding from the body, but instead the body of a "welding gun" also functions at the same time as a grip or a handle.

In welding guns of this type, the welding wire and shielding gas are passed axially lengthwise through the handle. The handle has an extension in the form of an arcuate shank, having its end provided with a welding nozzle and a shielding gas dome surrounding the nozzle.

A problem with such welding guns is that, in the process of welding various types of joints, the hand position may be wrong and the hand becomes tired as a result of having to support the welding gun. This makes welders susceptible to neck and shoulder ailments and the arm and palm may develop repetitive stress injuries, such as tendovaginitis.

Patent publication U.S. Pat. No. 6,225,599 discloses a MIG-welding gun, the handle of which comprises two axially successive handle elements, with e.g. a 20° angle therebetween. Even this does not eliminate the problem that, in the case of some welding joints, such as in overhead fillet and horizontal vertical fillet welding processes, the welding gun must nevertheless be supported by a hand in a slightly raised position in which the hand becomes tired.

It is an object of the invention to provide an ergonomic MIG- or MAG-welding grip, which enables the position of the hand to be changed between various types of joint welding in such a way that, e.g. in overhead fillet welding and vertical horizontal fillet welding processes, the hand can be held at quite a low level in a rest position while the body of a handle rests on top of the hand, whereby the hand does not get tired as easily as in the case of currently available welding guns. This object is accomplished by the invention on the basis of the characterizing features presented in the appended claims.

SUMMARY

The invention relates to a MIG- or MAG-welding gun, comprising a hand-held handle for supporting, handling and aiming the welding gun during a welding process, the handle including a body member and a grip member pivotable relative to the body member and lying alongside the body member at least partially over the same lengthwise extent as the body member, whereby the grip member has its free end pivotable to such a distance from the body member that a hand grasping around the pivotable grip member fits between the body member and the pivotable grip member, the body member resting on top of the hand.

BRIEF DESCRIPTION OF THE DRAWINGS

FIG. 1 is a right-side elevation view of a MIG- or MAG-welding gun according to an embodiment of the present invention.

FIG. 2 is a cross-section view as indicated in FIG. 1 of the grip member of the welding gun of FIG. 1

FIG. 3 is a right-side elevation view of the welding gun of FIG. 1 with the grip member pivoted alongside of the body member of the welding gun, such that the body member is at least partially accommodated within the trough shape defined by the grip member.

FIG. 4 is a cross-section view as indicated in FIG. 3 of the welding gun of FIG. 1 showing the body member at least partially accommodated within the trough shape defined by the grip member.

DETAILED DESCRIPTION

One exemplary embodiment of the invention will now be described more closely with reference to the accompanying drawings, which show a MIG- or MAG-welding gun of the invention.

In the illustrated exemplary embodiment, the welding gun comprises a body member 1 and a grip member 2 pivotable relative thereto and lying alongside the body member over at least part of the same longitudinal extent as the body member. The grip member 2 has its free end 6 pivotable to such a distance from the body member 1 that a hand grasping around the pivotable grip member 2 fits between the body member 1 and the pivotable grip member 2, the body member 1 resting on top of the hand in this working position. When the pivotable grip member 2 has its free end 6 pivoted into engagement with the body member 1, the body member 1 and the pivotable grip member 2 constitute jointly a handle 7 for the hand to grasp around, as shown in FIG. 3. Depending on whether a hand is used to grasp an opened-up grip member 2 or the handle 7 constituted jointly by the closed-in grip member 2 and the body member 1, it will be possible to choose the best possible position for the hand in the process of welding different types of joints. An actuating trigger 3 is included in the pivotable grip member 2 along its side facing away from the body member 1, in the proximity of that end of the pivotable grip member 2 which is provided with a pivot link 4. Thus, in the illustrated embodiment, the grip member 2 connects directly by way of the pivot link 4 to that end of the body member 1 which is closer to the nozzle end of the welding gun. A single pivot link 4 is the simplest and most cost-efficient solution. In practice, it does not increase the price of a welding gun at all. Still, instead of a simple pivot link 4, it is of course possible to employ other mechanisms as well, such as a combination of a pivot link and a slide, by means of which the components 1 and 2 can be brought appropriately apart from each other for a hand to fit therebetween while the hand is in a grasp around the grip member 2.

The pivotable grip member 2 further includes a limiter 5 for its pivoting angle, by means of which the pivoting angle is adjustable. Housed in the grip member 2 can be for example a thumbwheel for this adjustment. The pivotable grip member 2 has its pivoting angle relative to the body member's 1 longitudinal axis within the range of 30-75°, preferably 40-60°. Of course, the angle can be smaller if the pivoting motion is accompanied by said slide mechanism.

The pivotable grip member 2 preferably defines a trough 8, whereby the trough defined by grip member 2 can be dimensioned to fit over the body member 1 in such a way that the body member 1 is at least partially accommodated within the trough. As shown in FIG. 3 and FIG. 4, when the grip member 2 is pivoted alongside of, and into engagement with, the body member 1, the body member is at least partially accommodated within the trough shape defined by the grip member 2.

The cross-sectional view of FIG. 4 additionally illustrates the conduits that pass axially lengthwise along body member 1. Conduit 10 serves to feed welding wire to the welding nozzle, while conduits 12 and 14 serve to circulate a cooling fluid (liquid or gas). Centrally disposed conduit 16 houses an electric cable for providing the necessary welding current.

In the illustrated case, the body member 1 and pivotable grip member 2 constitute jointly a V-fork as the pivotable grip member 2 is in its position turned away from the body member 1.

The invention claimed is:

1. A welding gun for MIG- or MAG-welding, comprising:
a handle configured for supporting, handling and aiming the welding gun during a welding process, wherein the handle includes a body member and an elongate grip member that is pivotably coupled at a first end to the body member;
wherein the elongate grip member defines a trough shape dimensioned to fit over the body member, and the trough shaped grip member is pivotable relative to the body member such that when the trough shaped grip member is pivoted alongside the body member the body member is at least partially accommodated within the trough, and the body member and trough shaped grip member in combination form a handle for using the welding gun; and
the trough shaped grip member is further configured so that when the trough shaped grip member is pivoted away from the body member, the trough shaped grip member forms an alternate handle for using the welding gun such that when a hand is grasping the pivotable trough shaped grip member, the body member rests on top of the hand;
wherein the trough shaped grip member further includes an actuation trigger disposed adjacent the pivotable coupling on a side of the trough shaped grip member facing away from the body member when the trough shaped grip member is pivoted alongside the body member; and
where the trough shaped grip member defines a pivoting angle between the trough shaped grip member and a longitudinal axis of the body member, and the pivotable trough shaped grip member further includes a limiter for the pivoting angle.

2. The welding gun of claim 1, wherein the limiter is configured to adjust the pivoting angle.

3. The welding gun of claim 1, wherein the pivotable grip member defines a pivoting angle between the trough shaped grip member and a longitudinal axis of the body member, and the pivoting angle is within the range of 30-75°.

4. The welding gun of claim 1, wherein when the trough shaped grip member is pivoted away from the body member the body member and pivotable trough shaped grip member jointly constitute a V-fork.

5. The welding gun of claim 4, wherein the pivotable trough shaped grip member defines a pivoting angle between the trough shaped grip member and a longitudinal axis of the body member, and the pivoting angle is within the range of 40-60°.

6. A welding gun for MIG- or MAG-welding, the welding gun having a handle for supporting, handling, and aiming the welding gun during a welding process, the handle comprising:
an elongate body member;
an elongate grip member having a first end, a second end, an interior side facing the body member, and an exterior side facing away from the body member, wherein the grip member is pivotally coupled to the body member at the first end, and the interior side of the grip member defines an elongate cavity that is dimensioned to accommodate at least a portion of the body member; and
an actuation trigger disposed on the exterior side of the elongate grip member proximate the first end of the grip member;
wherein the handle is configured such that when the grip member is pivoted away from the body member, the welding gun is operable by a hand grasping the grip member with the body member disposed above the grasping hand; and when the grip member is pivoted into engagement with the body member, the body member is at least partially accommodated within the elongate cavity and the welding gun is operable by a hand grasping the body member and grip member in combination.

7. The welding gun of claim 6, wherein the grip member has a limited range of pivotable motion, and when the grip member is fully pivoted away from the body member the longitudinal axes of the body member and grip member define an acute angle.

8. The welding gun of claim 7, wherein the range of pivotable motion of the grip member is adjustable.

9. The welding gun of claim 7, wherein when the grip member is fully pivoted away from the body member the longitudinal axes of the body member and grip member define an angle of about 30°-78°.

10. The welding gun of claim 9, wherein when the grip member is fully pivoted away from the body member the longitudinal axes of the body member and grip member define an angle of about 40°-60°.

11. The welding gun of claim 6, wherein the elongate cavity extends substantially the entire length of the elongate grip member.

12. The welding gun of claim 11, wherein the elongate cavity is configured to at least partially accommodate the body member along the entire length of the elongate cavity.

13. The welding gun of claim 6, wherein the portion of the body member to be accommodated within the elongate cavity is substantially semi-cylindrical, and the elongate cavity is correspondingly substantially trough-shaped.

* * * * *